Feb. 13, 1962 H. FLEISHER 3,021,437

TRIGGER CIRCUITS EMPLOYING DIRECT COUPLED TRANSISTORS

Original Filed Oct. 29, 1953

INVENTOR
HAROLD FLEISHER
BY Lester W. Clark
ATTORNEY

United States Patent Office 3,021,437

Patented Feb. 13, 1962

3,021,437

TRIGGER CIRCUITS EMPLOYING DIRECT COUPLED TRANSISTORS

Harold Fleisher, Poughkeepsie, N.Y., assignor to International Business Machines Corporation, New York, N.Y., a corporation of New York Original application Oct. 29, 1953, Ser. No. 389,115, now Patent No. 2,903,602, dated Sept. 8, 1959. Divided and this application July 13, 1959, Ser. No. 826,708

8 Claims. (Cl. 307—88.5)

This application is a division of S.N. 389,115, filed October 29, 1953, now United States Patent No. 2,903,-602, granted September 8, 1959.

This invention relates to electric switching circuits of the type known as trigger circuits and particularly to trigger circuits employing transistors.

A type of switching circuit which has come into wide use, is known as a "trigger" circuit, or as a "regenerative switching" circuit. In such a circuit, one predetermined input signal or combination of input signals initiates a certain condition as to current or potential at the circuit output, and the circuit maintains that condition until a different predetermined input signal or combination of signals is received. Commonly, such a circuit has only two stable output states and it is shifted back and forth between its two states in response to the input signals.

A common form of regenerative circuit has a single input and single output, and is known as a trigger circuit. The output is, so to speak, triggered back and forth between its two stable states in response to distinctively different input pulses, for example, pulses of opposite polarities.

Transistors have recently come into use as relay devices broadly capable of functions similar to those of electromagnetic relays, vacuum tubes, and other devices which respond to a small input signal to control a larger output signal. Transistor current and potential characteristics are quite different from those of electromagnetic relays and of vacuum tubes, and consequently transistors cannot be directly substituted for those other relay devices in any given circuit. While the ultimate function of such a circuit using one or more transistors may be broadly equivalent to the ultimate function of a vacuum tube circuit, the structures of the two circuits are typically quite different.

Transistors are preferred to vacuum tubes and electromagnetic relays for many circuit applications because of their low power requirements, small space requirements and comparatively rapid response to input signals. Such advantages of transistors are particularly desirable in the case of circuits used in high speed computers, which may require thousands of such relay devices. The advantages to be gained with respect to the power requirements and space requirements from the use of transistors in such apparatus as opposed to vacuum tubes are very obvious.

An object of the invention is to provide a novel trigger circuit employing transistors.

Another object of the invention is to provide novel regenerative circuits employing transistors.

The foregoing and other objects of the invention are attained in a circuit including two transistors, each having input, output and common electrodes. A load circuit branch is provided including a source of direct electrical energy and a load impedance in series. The load circuit branch is connected between the output and common electrodes of one of the transistors. The input electrode of that transistor is connected directly and conductively, without intervening impedances, to the output electrode of the other transistor. A single signal input is provided between the input and common electrode of that other transistor. The common electrode of the one transistor is connected directly to ground and the common electrode of the other transistor is connected through a battery to ground.

Other objects and advantages of the invention will become apparent from a consideration of the following specification and claims, taken together with the accompanying drawings.

Figure 1:
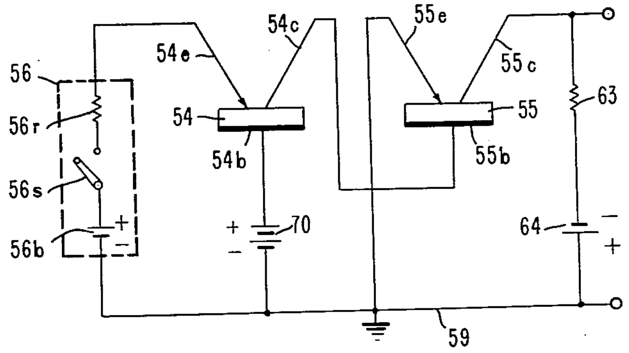
FIG. 1 is a wiring diagram of a trigger circuit embodying certain features of the invention.
Figure 2:
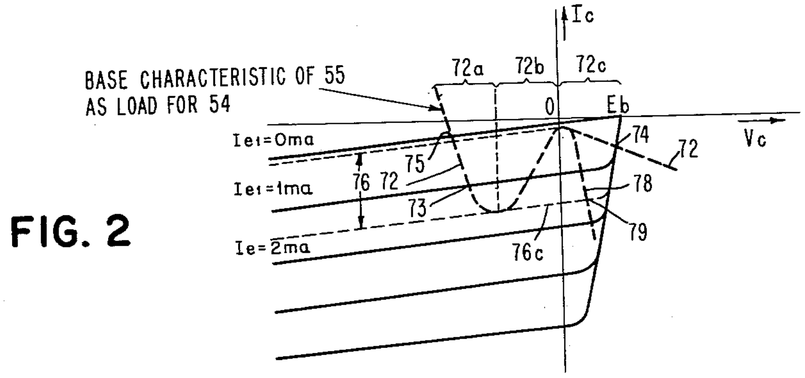
FIG. 2 is a graphical diagram illustrating the output characteristics of one of the transistors of FIG. 1.

*FIGURES 1 and 2*

The circuit of FIG. 1 is of the type commonly known as a regenerative or trigger circuit. This circuit includes two transistors 54 and 55 respectively having emitter electrodes **54*e* and 55*e*, collector electrodes 54*c* and and 55*c* and base electrodes 54*b* and 55*b***.

The emitter electrode **54*e* of transistor 54 is connected through a signal generator 56 which is shown, for purposes of illustration, as including a resistance 56*r*, a switch 56*s* and a battery 56*b*, to a wire 59, which is shown as grounded. The collector electrode 54*c* is connected directly to the base electrode 55*b* of transistor 55. Base electrode 54*b* is connected to the positive terminal of a battery 70, the negative terminal of which is connected to wire 59**.

The emitter electrode **55*e* of transistor 55 is connected to wire 59. Collector electrode 55*c* is connected through a resistance or load impedance 63 to the negative terminal of a battery 64. The positive terminal of battery 64 is connected to wire 59**.

FIG. 2 shows a family of collector current-potential characteristics for transistor 54, each curve being drawn for a constant value of emitter current. There is superimposed on this family of characteristics a curve 72. Curve 72 is derived from the base current-collector potential characteristic of transistor 55, taken with a grounded emitter, by simply inverting that characteristic about the $V_c$ axis. This inversion is justified by the circuit connections of FIG. 1, since the base potential of transistor 55 is the same as the collector potential of transistor 54, and since the base current of transistor 55 is the negative of the collector current of transistor 54. This curve 72 accurately represents the load on the collector or output electrode of transistor 54.

Referring to FIG. 2 it may be seen that curve 72 includes two regions **72*a* and 72*c* of positive slope separated by a region 72*b* of negative slope. The circuit is stable when it is operaticg in either of the regions 72*a* and 72*c*, but is not stable in the region 72*b*. The region 72*a* is characterized by high collector current in transistor 55, and the region 72*c* is characterized by low collector current in transistor 55** .

Starting with a quiescent emitter current in transistor 54 of 1 ma., the circuit operates stably at the point 73 in region **72*a*. If the emitter current is now increased, as for example by transmission of a positive signal to the emitter 54*e*, increasing the emitter current to 2 ma., the operating point will move to the right-hand side of the stable region 72*a*, and then will suddenly move into the stable region 72*c* at the point 74 where the curve 72 is intersected by the whole family of characteristics of transistor 54, in the saturation operating region of transistor 54. When the emitter current is reduced to the quiescent value, point 74 remains as the stable operating point. If now the emitter current is reduced, below the quiescent value, the operating point will move to the left along the curve 72 until it comes to the unstable negative resistance region 72***b* and will then move suddenly to the point 75 in the stable region 72*a*. As long as the emitter current is in a range indicated at 76 in FIG. 2, the circuit will operate stably either in the region 72*a* or 72*c*. An emitter current less than that defined by the region 76 will cause the circuit to operate in the region 72*a*, while an emitter current greater than that defined by region 76 will cause operation in the region 72*c*.

The circuit is normally operated with a so-called quiescent point in the region 76 and is triggered back and forth between its two output states by applying signals to the emitter of transistor 54 such that the emitter current 54 becomes greater than or less than the quiescent current by an amount at least slightly in excess of the current excursion designated by region 76.

*FIGURE 3*

Figure 3:
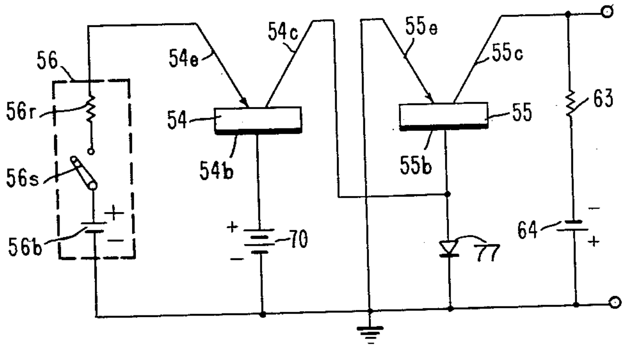
FIG. 3 is a wiring diagram of a modified form of the trigger circuit of FIG. 1.

FIG. 3 shows a modified form of the circuit of FIG. 1 in which a diode 77 is connected between the base of transistor 55 and ground. The major effect of this modification is to change the slope of the load line in the 72*c* region to a value indicated by the line 78 in FIG. 2.

The principal advantages of using this asymmetric unit 77 are that less collector power is dissipated when the circuit is operating in the 72*c* region, and that a more distinct operating point is provided in that region. In this connection, note that intersection 79, between the curve 78 and the emitter current curve 76*c* is sharper than intersection 74 between curve 72 and curve 76*c*. This represents a substantially more stable and more clearly defined operating condition in the output circuit.

In the various circuits illustrated, I have shown and described specific signal generator structures. My invention is in no way limited to the specific signal generator structures shown and described, but any electrically equivalent signal generator may be used in place thereof.

While the various features of the invention are described above as applied to circuits employing point contact transistors with N-type semi-conductive material, it will readily be recognized by those skilled in the art that the circuits could be modified to secure similar results with P-type semi-conductive material, in many cases by simply reversing the polarities of the potentials. Furthermore, the circuits could be modified to use junction transistors, either of the PNP or NPN types.

I claim:

1. A bistable circuit comprising two transistors, each having input, output and common electrodes, a load impedance, a source of direct electrical energy, means connecting the load impedance and the source in series between the output electrode of one of the transistors and a junction, means coupling the input electrode of said one transistor to the output electrode of the other transistor directly and conductively, without intervening coupling impedances, so that the output electrode current-potential characteristic of the other transistor is determined at least in part by the one transistor and includes two separate ranges of output electrode potential wherein the circuit is stable and an intervening range of output electrode potential wherein the circuit is unstable, means connecting the common electrode of said one transistor to said junction directly and conductively, without intervening coupling impedances, means connected to the common electrode of the other transistor and effective to main tain said common electrode at a fixed potential different from that of said junction, and signal input means connected between said junction and the input electrode of said other transistor and operable to shift the output electrode potential of said other transistor between values respectively located in said two separated ranges.

2. A trigger circuit comprising first and second transistors, each having input, output and common electrodes, a load impedance and a source of unidirectional electrical energy connected in series between the output electrode of said first transistor and a junction, means coupling the input electrode of said first transistor to the output electrode of said second transistor directly and conductively, without intervening coupling impedances, means connecting the common electrode of said first transistor to said junction directly and conductively, without intervening coupling impedances, means connected to the common electrode of said second transistor and effective to maintain said common electrode at a fixed potential different from that of said junction, and signal input means shiftable between two readily distinguishable signal conditions connected between the input electrode of said second transistor and said junction and effective to switch operation of the circuit between two stable operating conditions.

3. A circuit as defined in claim 2 including a diode connected between the input electrode of said first transistor and said junction.

4. A transistor switching circuit comprising first and second transistors, each having input, output and common electrodes, means for supplying input signals to only said first transistor, said means comprising a source of input signals having one terminal connected to the common electrode of the first transistor and an opposite terminal connected to the input electrode of the first transistor, a direct conductive connection between the output electrode of the first transistor and the input electrode of the second transistor, said connection comprising the only electrical connection of said last-mentioned electrodes, means supplying fixed operating potentials to the common electrodes of the respective transistors, means supplying direct electrical energy to the output electrode of the second transistor, and means for deriving an output signal from the output electrode of the second transistor.

5. A transistor circuit comprising first and second transistors, each having base, emitter and collector electrodes, means for supplying input signals to only said first transistor, said means comprising a source of input signals connected between the emitter and base electrodes of the first transistor, a direct conductive connection between the collector electrode of the first transistor and the base electrode of the second transistor, means supplying operating potentials to the colletcor and emitter electrodes of the second transistor, and means for deriving an output signal from the collector electrode of the second transistor.

6. A transistor switching circuit comprising first and second transistors, each having base, emitter and collector electrodes, input signal supply means connected between the emitter and base electrodes of the first transistor, a direct conductive connection between the collector electrode of the first transistor and the base of the second transistor, said connection comprising the only electrical connection of said last-mentioned electrodes so that the same current flows through the collector electrode of the first transistor and through the base electrode of the second transistor, means supplying biasing potentials to the collector and emitter electrodes of the second transistor, and means for deriving an output signal from the collector electrode of the second transistor.

7. A transistor circuit comprising first and second transistors, each having base, emitter and collector electrodes, a single source of input signals having two terminals, one terminal connected to the emitter electrode of the first transistor and the other terminal connected to the base electrode of the first transistor, a direct conductive connection, without intervening impedance, between the collector electrode of the first transistor and the base electrode of the second transistor, a load resistor and a source of direct electrical energy connected in series between the collector electrode of the second transistor and a junction, a direct conductive connection, without intervening impedance, between the emitter electrode of the second transistor and said junction, a connection between said junction and said other terminal of the source of input signals, and a pair of output terminals connected respectively to the collector electrode of the second transistor and to said junction.

8. A transistor trigger circuit, comprising first and second transistors, each having base, emitter and collector electrodes, a direct conductive connection, without intervening impedance, between the collector electrode of the first transistor and the base electrode of the second transistor, a load resistor and a source of direct electrical energy connected in series between the collector electrode of the second transistor and a junction, said second transistor acting as a substantial part of the load on the first transistor and providing an operating characteristic for the first transistor including a low current stable region, an intermediate current unstable region, and a high current stable region, a single source of input signals having two terminals, one terminal connected to the emitter electrode of the first transistor and the other terminal connected to the base electrode of the first transistor, said signal source being shiftable between a low current condition wherein it is effective to hold the first transistor in its low current stable region and a high current condition wherein it is effective to hold the first transistor in its high current stable region, means connecting the base electrode of the first transistor and the emitter electrode of the second transistor to the junction, and a pair of output terminals connected respectively to the collector electrode of the second transistor and to said junction.

References Cited in the file of this patent

UNITED STATES PATENTS

| | | |
|---|---|---|
| 2,595,208 | Bangert | Apr. 29, 1952 |
| 2,655,609 | Shockley | Oct. 13, 1953 |
| 2,662,124 | McMillan | Dec. 8, 1953 |
| 2,794,076 | Shea | May 28, 1957 |

OTHER REFERENCES

W. M. Webster et al.: "Some Novel Circuits for the Three Terminal Semiconductor Amplifier," RCA Review, March 1949, page 14.

F. C. Williams et al.: "A Method of Designing Transistor Trigger Circuits," IEE, vol. 100, part 3, 1953, pages 228 to 247.